US009660457B2

United States Patent
Takigawa

(10) Patent No.: US 9,660,457 B2
(45) Date of Patent: May 23, 2017

(54) FEED LINE SWITCHING APPARATUS, OPTICAL SUBMARINE BRANCHING APPARATUS, SUBMARINE CABLE SYSTEM, AND FEED LINE SWITCHING METHOD

(75) Inventor: Yoshinari Takigawa, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 14/124,232

(22) PCT Filed: Jun. 29, 2012

(86) PCT No.: PCT/JP2012/066777
§ 371 (c)(1),
(2), (4) Date: Dec. 5, 2013

(87) PCT Pub. No.: WO2013/002391
PCT Pub. Date: Jan. 3, 2013

(65) Prior Publication Data
US 2014/0103739 A1    Apr. 17, 2014

(30) Foreign Application Priority Data
Jun. 30, 2011    (JP) .................. 2011-145089

(51) Int. Cl.
*H01H 83/00*    (2006.01)
*H02J 4/00*    (2006.01)
(Continued)

(52) U.S. Cl.
CPC .................. *H02J 4/00* (2013.01); *H04B 3/44* (2013.01); *H04B 10/25* (2013.01); *H04B 10/808* (2013.01); *Y10T 307/74* (2015.04)

(58) Field of Classification Search
CPC .. H02J 4/00; H04B 3/44; H04B 10/25; H04B 10/808
See application file for complete search history.

(56) References Cited

U.S. PATENT DOCUMENTS 6,714,394 B1    3/2004 Kumayasu et al.
7,085,456 B1 *  8/2006 Nagel .................. G02B 6/4441
                                                                   385/100

FOREIGN PATENT DOCUMENTS

FR    2812987 A1    2/2002
JP    S63-189025 A    8/1988
(Continued)

OTHER PUBLICATIONS

International Search Report of PCT/JP2012/066777 mailed Jul. 31, 2012 (2 pages).
(Continued)

*Primary Examiner* — Daniel Cavallari
(74) *Attorney, Agent, or Firm* — Wilmer Cutler Pickering Hale and Dorr LLP

(57) ABSTRACT

In a feed line switching apparatus, a situation in which the feed line switching apparatus cannot work when feed lines have a predetermined connection relationship is prevented. The feed line switching apparatus includes a command acquisition unit which acquires a feed line switching command which designates a connection relationship of feed lines, a switching execution unit which switches the connection relationship of the feed lines in accordance with the feed line switching command acquired by the command acquisition unit, and a switching control unit which suppresses switching of the connection relationship of the feed lines in the switching execution unit for a predetermined feed line switching command.

17 Claims, 11 Drawing Sheets

(51) Int. Cl.
    *H04B 3/44*     (2006.01)
    *H04B 10/25*     (2013.01)
    *H04B 10/80*     (2013.01)

(56) References Cited

FOREIGN PATENT DOCUMENTS

| | | |
|---|---|---|
| JP | A-02-053332 | 2/1990 |
| JP | A-05-327561 | 12/1993 |
| JP | A-07-264105 | 10/1995 |
| JP | A-2002-057607 | 2/2002 |
| JP | 3471914 B2 | 12/2003 |

OTHER PUBLICATIONS

Office Action issued by the Japan Patent Office for Application No. 2013-522992 mailed Sep. 30, 2014 (5 pgs.).

\* cited by examiner

FEED LINE SWITCHING APPARATUS, OPTICAL SUBMARINE BRANCHING APPARATUS, SUBMARINE CABLE SYSTEM, AND FEED LINE SWITCHING METHOD

CROSS-REFERENCE TO RELATED APPLICATIONS

This application is a national stage application of International Patent Application No. PCT/JP2012/066777, filed on Jun. 29, 2012, and which claims the benefit of the priority of Japanese Patent Application No. 2011-145089, filed on Jun. 30, 2011, the contents of which are incorporated herein by reference in their entirety.

TECHNICAL FIELD

The present invention relates to a feed line switching apparatus, an optical submarine branching apparatus, a submarine cable system, and a feed line switching method.

BACKGROUND ART

A feed line switching apparatus or a feed line switching circuit which switches a connection relationship of a plurality of feed lines is used in, for example, an optical submarine branching apparatus used in a submarine cable system, and, when failure occurs in a feed line to the optical submarine branching apparatus, performs switching to another feed line.

For example, the optical submarine branching apparatus which switches a feed line in accordance with a command signal is called a remote control type submarine branching apparatus. Here, in the submarine cable system, building of a network including a plurality of branching apparatuses and terminal station apparatuses is required because of a request for a growing mesh of the network, reduction of construction cost, or the like. As the network becomes complex, control of the feed lines becomes difficult in a current-switching type branching apparatus and thus a remote control type submarine branching apparatus is used. In the remote control type submarine branching apparatus, the feed line can be switched in accordance with a command signal from the terminal station apparatus.

In conjunction with the feed line switching apparatus or the feed line switching circuit, a feed switching circuit of an undersea branching apparatus described in Patent Document 1 is configured such that, first, second, and third switching relays are arranged in first, second, and third branches of an electric path branched in three directions so that directions of operation currents are the same when viewed from its branching point, respectively, the first, second, and third switching relays have contacts for closing the second, third, and first electric branch paths normally and opening earth fault paths thereof normally, at least the earth fault path of the second branch is provided with a self-holding relay having a contact for self-holding the earth fault path, and the self-holding relay further has a normally open contact which is a path used to bypass a normally closed contact of the first branch.

PRIOR ART DOCUMENT

Patent Document

Patent Document 1: Japanese Unexamined Patent Application, First Publication No. Hei 7-264105

SUMMARY OF INVENTION

Problems to be Solved by the Invention

Depending on the state of feed lines in which a feed line switching apparatus or a feed line switching circuit is installed, if the feed lines have a predetermined connection relationship, power supply may be cut off and the feed line switching apparatus may not work. For example, when feed lines (power cables) are connected to a plurality of power reception terminals included in the feed line switching apparatus, respectively, and the feed line switching apparatus is used with any of the feed lines being unconnected to a terminal station (when an initial branch is unconnected), even if the unconnected feed line is connected to another feed line, power cannot be obtained from the connected feed line. Here, when the feed line switching apparatus itself works with power obtained from the feed line, there is a possibility that the feed line switching apparatus does not receive supply of power and thus does work (falls into an irrecoverable situation). For example, if the feed line switching apparatus used in the submarine branching apparatus does not work, it is necessary to pull up the submarine branching apparatus and perform maintenance, which takes considerable effort and expense.

An exemplary object of the present invention is to provide a feed line switching apparatus, an optical submarine branching apparatus, a submarine cable system, and a feed line switching method capable of solving the above-described problems.

Means for Solving the Problems

The present invention has been made to solve the problems described above, and a feed line switching apparatus in accordance with an aspect of the present invention includes a command acquisition unit which acquires a feed line switching command which designates a connection relationship of feed lines; a switching execution unit which switches the connection relationship of the feed lines in accordance with the feed line switching command acquired by the command acquisition unit; and a switching control unit which suppresses switching of the connection relationship of the feed lines in the switching execution unit for a predetermined feed line switching command.

Furthermore, an optical submarine branching apparatus in accordance with an aspect of the present invention includes the feed line switching apparatus described above.

Further, a submarine cable system in accordance with an aspect of the present invention includes the optical submarine branching apparatus described above.

A feed line switching method in accordance with an aspect of the present invention is a feed line switching method of a feed line switching apparatus, and includes acquiring a feed line switching command which designates a connection relationship of feed lines; switching the connection relationship of the feed lines in accordance with the acquired feed line switching command; and suppressing switching of the connection relationship of the feed lines for a predetermined feed line switching command.

Exemplary Advantages of Invention

With the present invention, it is possible to prevent a situation in which the feed line switching apparatus does not work when the feed lines have a predetermined connection relationship.

MODES FOR CARRYING OUT THE INVENTION

Hereinafter, exemplary embodiments of the present invention will be described with reference to drawings.

Figure 1:
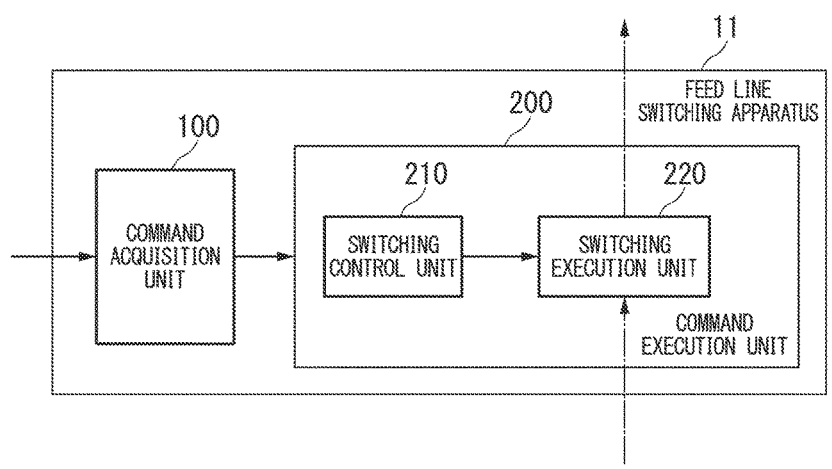
FIG. 1 is a configuration diagram illustrating a schematic configuration of a feed line switching apparatus in an exemplary embodiment of the present invention.

FIG. 1 is a configuration diagram illustrating a schematic configuration of a feed line switching apparatus in an exemplary embodiment of the present invention. In FIG. 1, a feed line switching apparatus 11 includes a command acquisition unit 100 and a command execution unit 200. The command execution unit 200 includes a switching control unit 210 and a switching execution unit 220.

The feed line switching apparatus 11 switches a connection relationship of a plurality of feed lines. The feed line referred to herein is an individual power supply cable connected to the feed line switching apparatus 11 (a power reception terminal included in the switching execution unit 220). It is to be noted that hereinafter, switching of the connection relationship of the feed lines is referred to as "feed line switching".

The command acquisition unit 100 acquires a feed line switching command. The feeding switching command referred to herein is a command which designates a connection relationship of the feed lines and instructs to switch to the connection relationship.

The switching execution unit 220 switches the connection relationship of the feed lines in accordance with the feed line switching command acquired by the command acquisition unit 100.

The switching control unit 210 suppresses switching of the connection relationship of the feed lines (feed line switching) in the switching execution unit 220 for a predetermined feed line switching command. For example, the switching control unit 210 stores this predetermined feed line switching command in advance (before the feed line switching apparatus 11 performs feed line switching).

The command execution unit 200 including the switching execution unit 220 and the switching control unit 210 suppresses switching for predetermined feed line switching commands among the feed line switching commands acquired by the command acquisition unit 100 (does not execute switching) and performs switching of the other feed line switching commands. As the command execution unit 200 suppresses switching for the predetermined feed line switching commands, it is possible to avoid a situation in which the feed line switching apparatus does not work when the feed lines have a predetermined connection relationship.

Next, the present exemplary embodiment will be described in greater detail with reference to FIGS. 2 to 7 for an example when the present invention is applied to an optical submarine branching apparatus.

Figure 2:
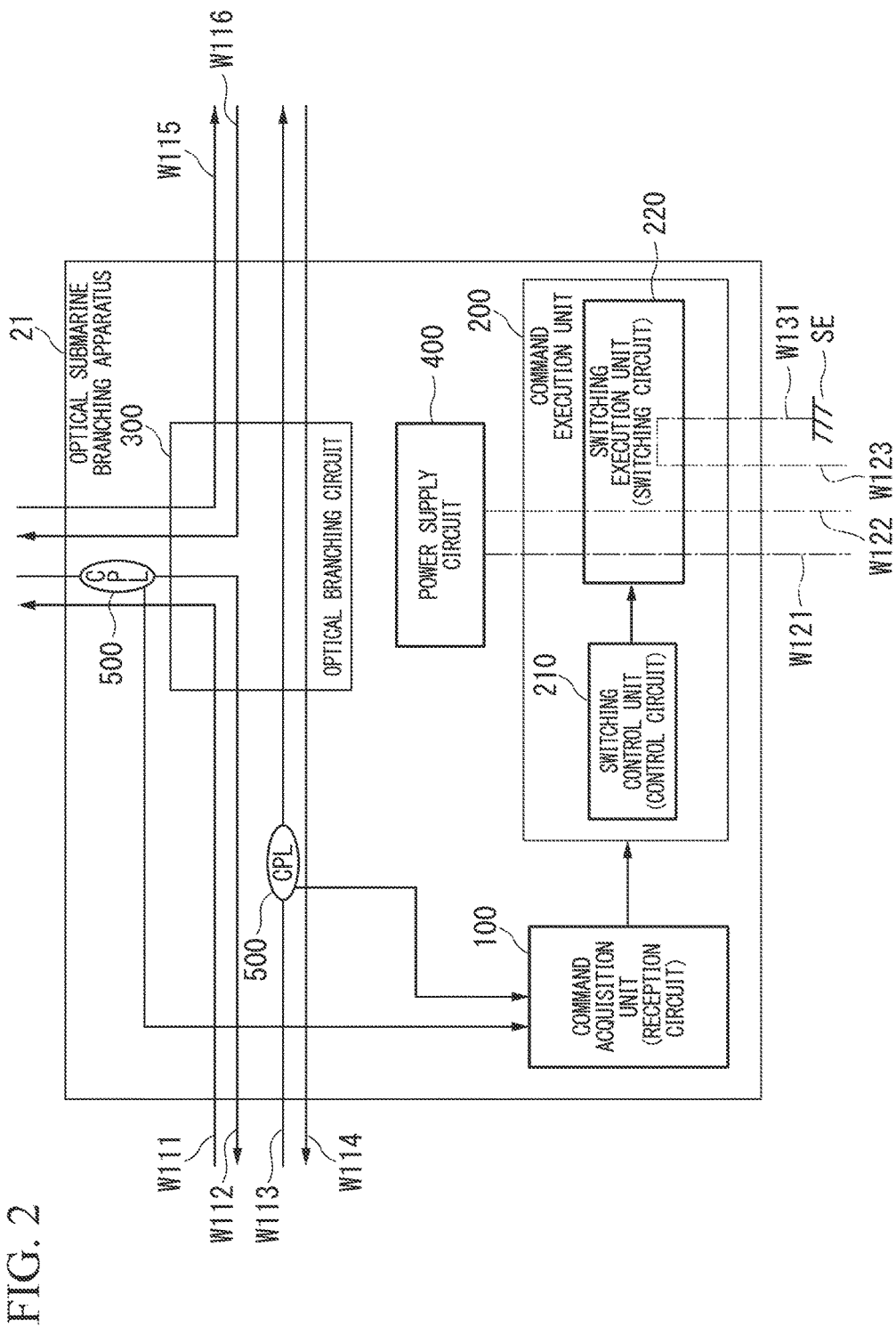
FIG. 2 is a configuration diagram illustrating a schematic configuration of an optical submarine branching apparatus including the feed line switching apparatus in the same exemplary embodiment.

FIG. 2 is a configuration diagram illustrating a schematic configuration of an optical submarine branching apparatus including the feed line switching apparatus 11 (FIG. 1). In FIG. 2, the optical submarine branching apparatus 21 includes the command acquisition unit 100 and the command execution unit 200 illustrated in FIG. 1, and the command execution unit 200 includes the switching control unit 210 and the switching execution unit 220. Furthermore, the optical submarine branching apparatus 21 includes an optical branching circuit 300, a power supply circuit 400, and optical couplers 500.

The optical submarine branching apparatus 21 is a branching apparatus used in a submarine cable system, and receives an optical signal transmitted from a terminal station through an optical cable (optical fiber), branches the optical signal into a plurality of paths, and transmits (transfers) the optical signal to each terminal station of a branch destination through an optical cable provided in each path.

Furthermore, the optical submarine branching apparatus 21 works using power supplied from the terminal station through the feed line (hereinafter referred to simply as "power supplied from the feed line"). If failure occurs in the feed line, the optical submarine branching apparatus 21 switches the connection relationship of the feed lines and secures reception of supply of power.

The optical branching circuit 300 transfers optical signals transmitted through paths W111 to W116. It is to be noted that various types of optical branching circuits may be used as the optical branching circuit 300. For example, the optical branching circuit 300 may be an optical branching circuit of a fiber branch type which branches an optical signal in units of optical fibers or it may be an optical branching circuit of an OADM (Optical Add Drop Multiplexer) type which branches an optical signal in units of wavelengths. Furthermore, the optical branching circuit 300 is not limited to the optical branching circuit which transfers the optical signal in three directions as illustrated in FIG. 2, and it may be an optical branching circuit which transfers an optical signal in four or more directions.

The optical couplers 500 branch the optical signal flowing through the path W112 and the optical signal flowing through the path W113 and output them to the command acquisition unit 100.

The power supply circuit 400 receives power from feed lines which are connected to the power supply circuit 400 itself as a result of feed line switching performed by the switching execution unit 220, and supplies the power to each unit of the optical submarine branching apparatus 21.

The command acquisition unit 100 acquires a feed line switching command as described above. In the example of FIG. 2, the feed line switching command is included in the optical signal flowing through the path W112 and the optical signal flowing through the path W113 and transmitted. Also, the command acquisition unit 100 decodes the optical signals branched using the optical couplers 500 to extract (acquire) the feed line switching command, and outputs the extracted feed line switching command to the command execution unit 200. This feed line switching command is, for example, transmitted from a terminal station of a submarine cable system in which the optical submarine branching apparatus 21 is used.

Here, the reason why the command acquisition unit 100 is capable of acquiring the feed line switching command from both of the path W112 and the path W113 is to increase failure tolerance. For example, when failure occurs in the optical cable of the path W112, the command acquisition unit 100 can acquire the feed line switching command using the path 113. It is to be noted that the number of paths through which the command acquisition unit 100 can acquire the feed line switching command is not limited to two as illustrated in FIG. 2 and may be one or more.

The switching execution unit 220 switches the connection relationship of the feed lines in accordance with the feed line switching command acquired by the command acquisition unit 100, as described above. In the example of FIG. 2, the switching execution unit 220 connects with feed lines W121 to W123, and connects the feed lines W121 and W122 among these feed lines to the power supply circuit and connects the remaining feed line W123 to sea earth SE.

The switching control unit 210 suppresses the feed line switching in the switching execution unit 220 for a predetermined feed line switching command, as described above. For example, the switching control unit 210 stores this predetermined feed line switching command in advance before the optical submarine branching apparatus 21 is installed on the bottom of the sea. In other words, in order to reliably suppress switching based on the predetermined feed line switching command, a user of the optical submarine branching apparatus 21 performs a setting to suppress switching based on the predetermined feed line switching command before the optical submarine branching apparatus 21 is installed on the bottom of the sea.

Figure 3:
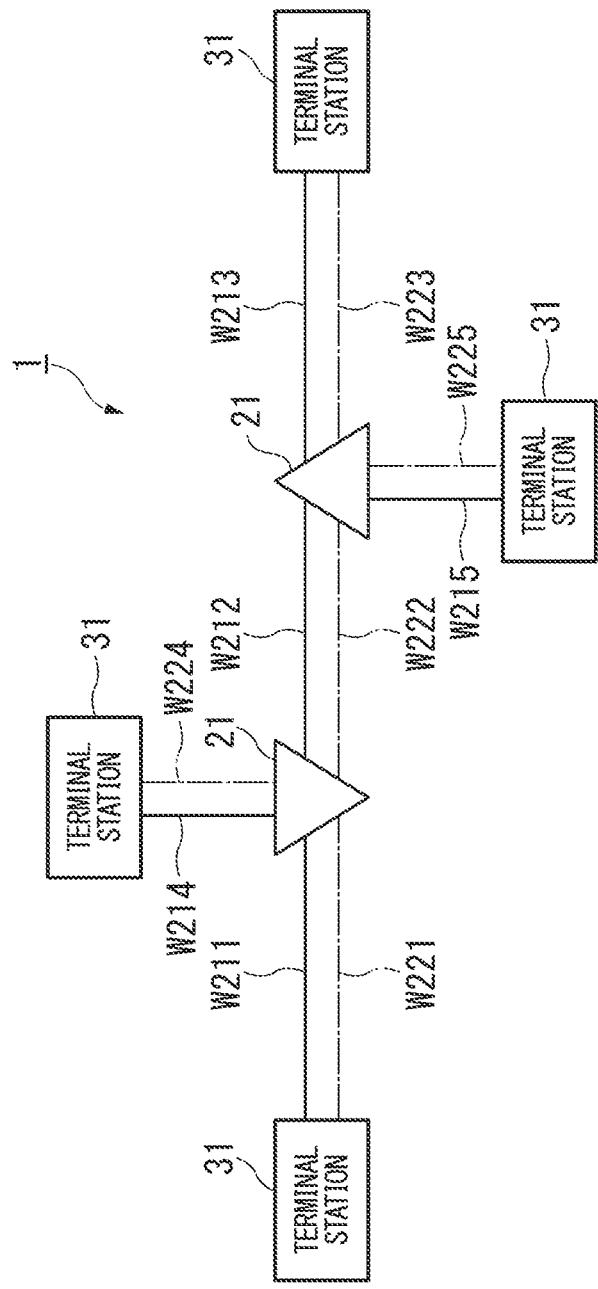
FIG. 3 is a configuration diagram illustrating a schematic configuration of a submarine cable system including the optical submarine branching apparatus in the same exemplary embodiment.

FIG. 3 is a configuration diagram illustrating a schematic configuration of a submarine cable system including the optical submarine branching apparatus 21 (FIG. 2). In FIG. 3, a submarine cable system 1 includes four terminal stations 31 and two optical submarine branching apparatuses 21. The terminal stations 31 and the optical submarine branching apparatuses 21 are connected by optical cables W211 to W215 and power supply cables W221 to W225. Each of the power supply cables W221 to W225 corresponds to a feed line.

Each of the terminal stations 31 communicates with the other terminal stations via the optical cables and the optical submarine branching apparatuses 21. Furthermore, the terminal stations 31 supply power to the optical submarine branching apparatuses 21 through the power supply cables. Furthermore, the terminal stations 31 transmit feed line switching commands to the optical submarine branching apparatuses 21.

The optical submarine branching apparatuses 21 work with the power supplied from the terminal stations via the power supply cables, and branch optical signals communicated between the terminal stations. Furthermore, the optical submarine branching apparatus 21 switch a connection relationship of the feed lines in accordance with the feed line switching commands transmitted from the terminal stations 31.

Figure 4A:
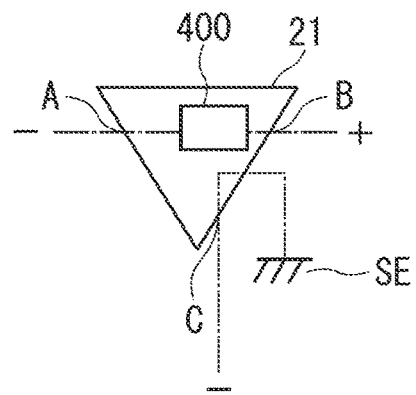
FIG. 4A is a descriptive diagram illustrating an example of a connection relationship of feed lines switched by the optical submarine branching apparatus in the same exemplary embodiment.
Figure 4B:
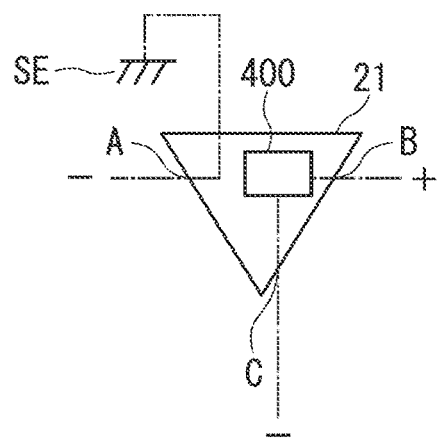
FIG. 4B is a descriptive diagram illustrating an example of a connection relationship of feed lines switched by the optical submarine branching apparatus in the same exemplary embodiment.
Figure 4C:
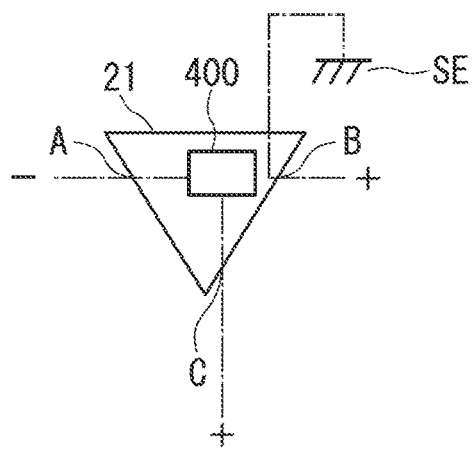
FIG. 4C is a descriptive diagram illustrating an example of a connection relationship of feed lines switched by the optical submarine branching apparatus in the same exemplary embodiment.

FIGS. 4A to 4C are descriptive diagrams illustrating examples of the connection relationship of the feed lines switched by an optical submarine branching apparatus 21. In FIGS. 4A to 4C, the optical submarine branching apparatus 21 includes power reception terminals A to C, and connects two of the feed lines connected to the power reception terminals to the power supply circuit 400 and connects the other feed line to the sea earth SE.

In FIG. 4A, the optical submarine branching apparatus 21 connects the feed line connected to the power reception terminal A and the feed line connected to the power reception terminal B to the power supply circuit 400 and connects the feed line connected to the power reception terminal C to the sea earth SE. Furthermore, in FIG. 4B, the optical submarine branching apparatus 21 connects the feed line connected to the power reception terminal B and the feed line connected to the power reception terminal C to the power supply circuit 400 and connects the feed line connected to the power reception terminal A to the sea earth SE. Furthermore, in FIG. 4C, the optical submarine branching apparatus 21 connects the feed line connected to the power reception terminal A and the feed line connected to the power reception terminal C to the power supply circuit 400 and connects the feed line connected to the power reception terminal B to the sea earth SE.

Thus, as the optical submarine branching apparatus 21 switches the connection relationship of the feed lines, supply of the power from the feed lines continues and the optical submarine branching apparatus 21 itself can receive the power and work continuously even if failure occurs in a feed line.

Figure 5:
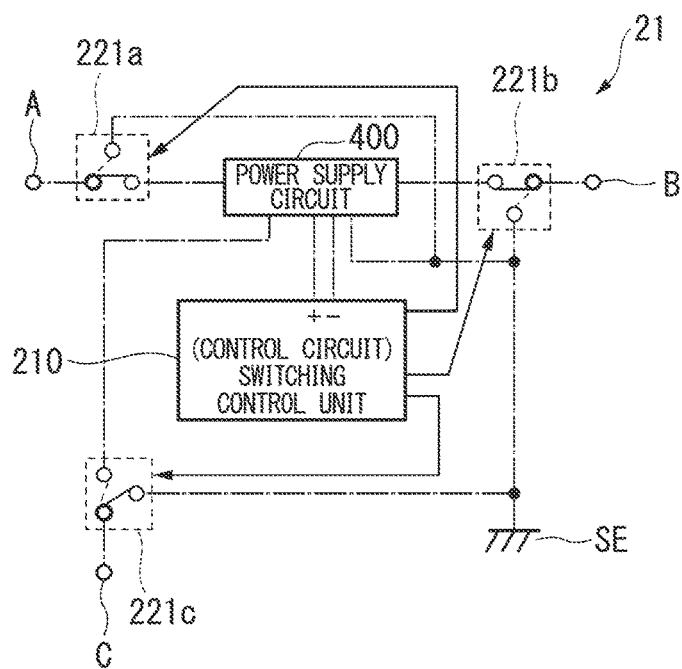
FIG. 5 is a configuration diagram illustrating a configuration example of a means with which the optical submarine branching apparatus switches the connection relationship of the feed lines in the same exemplary embodiment.

FIG. 5 is a configuration diagram illustrating a configuration example of a means with which the optical submarine branching apparatus 21 switches the connection relationship of the feed lines. In FIG. 5, the optical submarine branching apparatus 21 includes the switching control unit 210, line switching units 221a to 221c, the power supply circuit 400, and the power reception terminals A to C. In FIG. 5, the same units as those of FIG. 2 are denoted by same reference signs (210 and 400) and a description thereof is omitted.

It is to be noted that, hereinafter, the line switching units 221a to 221c are collectively referred to as a "line switching unit 221".

The line switching unit 221a connects with the feed line through the power reception terminal A and connects the feed line to the power supply circuit 400 or the sea earth SE. Similarly, the line switching unit 221b connects with the feed line through the power reception terminal B and connects the feed line to the power supply circuit 400 or the sea earth SE. The switching unit 221c connects with the feed line through the power reception terminal C and connects the feed line to the power supply circuit 400 or the sea earth SE.

The line switching unit 221 has a function of switching a power path, and switches a connection destination of the feed line to the power supply circuit 400 or the sea earth SE under control of the switching control unit 210. For example, the line switching unit 221 includes a bi-stable relay (latching relay), and connects the feed line to the power supply circuit 400 when a current flows from the switching control unit 210 to a set coil, and connects the feed line to the sea earth SE when the current flows to a reset coil.

Figure 6:
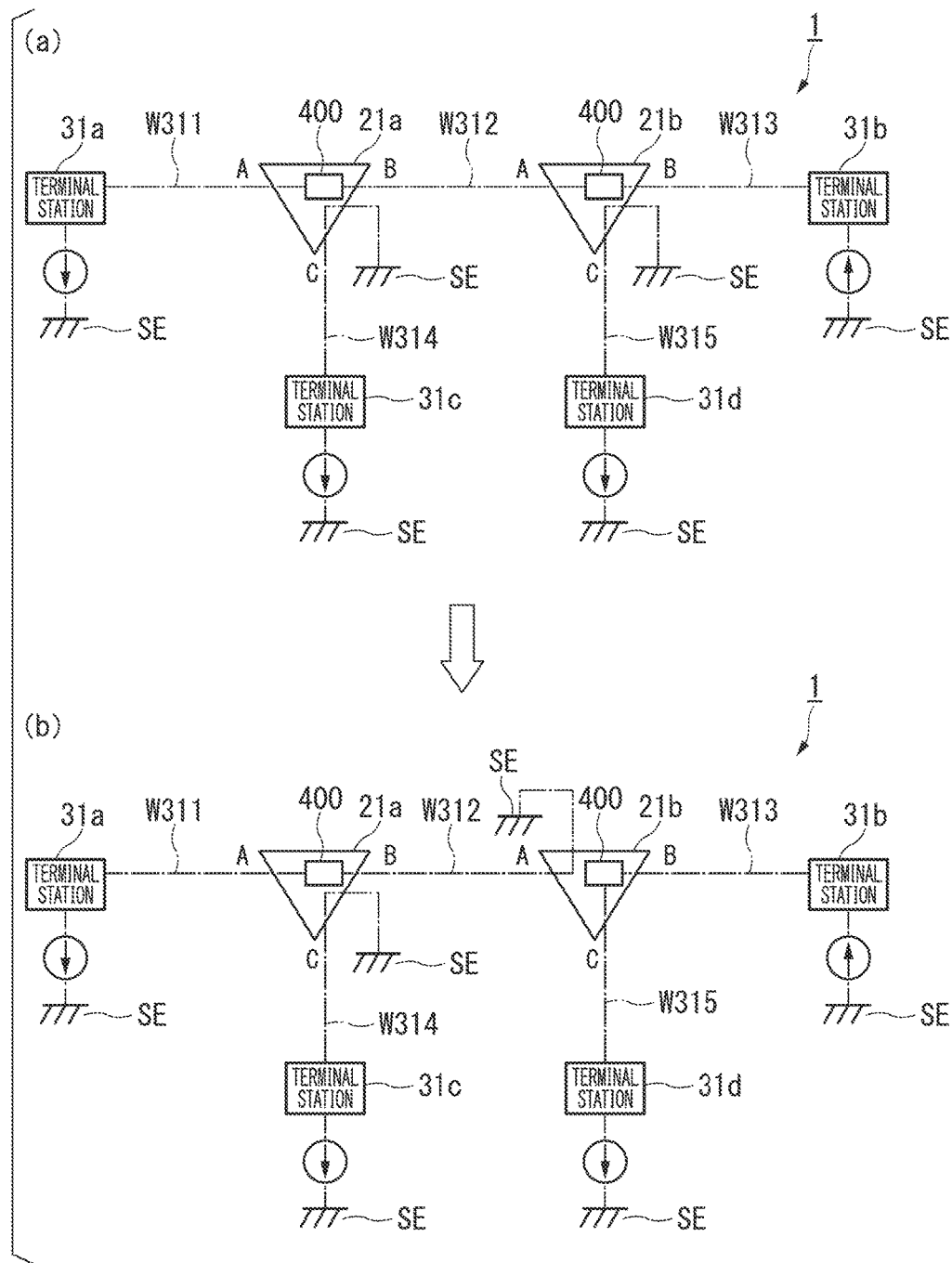
FIG. 6 is a descriptive diagram illustrating an example of feed line switching in the submarine cable system of the same exemplary embodiment.

FIG. 6 is a descriptive diagram illustrating an example of feed line switching in the submarine cable system 1. In FIG. 6, the optical submarine branching apparatus 21 is denoted by a reference sign 21a or 21b to distinguish the optical submarine branching apparatuses 21 from each other. Furthermore, the terminal stations 31 are denoted by reference signs 31a to 31d to distinguish the terminal stations 31 from each other. The same also applies to FIG. 7 which will be described below.

In FIG. 6(a), the terminal station 31a and the terminal station 31b are connected through feed lines W311, W312, and W313 and the optical submarine branching apparatuses 21a and 21b, and power is supplied in a direction from the terminal station 31b to the terminal station 31a. The optical submarine branching apparatuses 21a and 21b work with this power. Furthermore, the terminal station 31c is connected to the sea earth SE through a feed line W314 and to the optical submarine branching apparatus 21a. Furthermore, the terminal station 31d is connected to the sea earth SE through a feed line W315 and to the optical submarine branching apparatus 21b.

As the optical submarine branching apparatus 21b performs feed line switching to connect the feed line W312 to the sea earth SE and the feed line W313 to the feed line W315, the state of FIG. 6(a) is changed to the state of FIG. 6(b). In FIG. 6(b), the terminal station 31b and the terminal station 31d are connected through the feed lines W313 and W315 and the optical submarine branching apparatus 21b, and power is supplied in a direction from the terminal station 31b to the terminal station 31d. The optical submarine branching apparatus 21b works with this power.

As a result of feed line switching from FIG. 6(a) to FIG. 6(b), if failure occurs in, for example, the feed line W312, it is possible to stop supply of power in the feed line W312 while performing supply of power between the terminal station 31b and the terminal station 31d, and thus it is possible to perform recovery work relatively easily.

Figure 7:
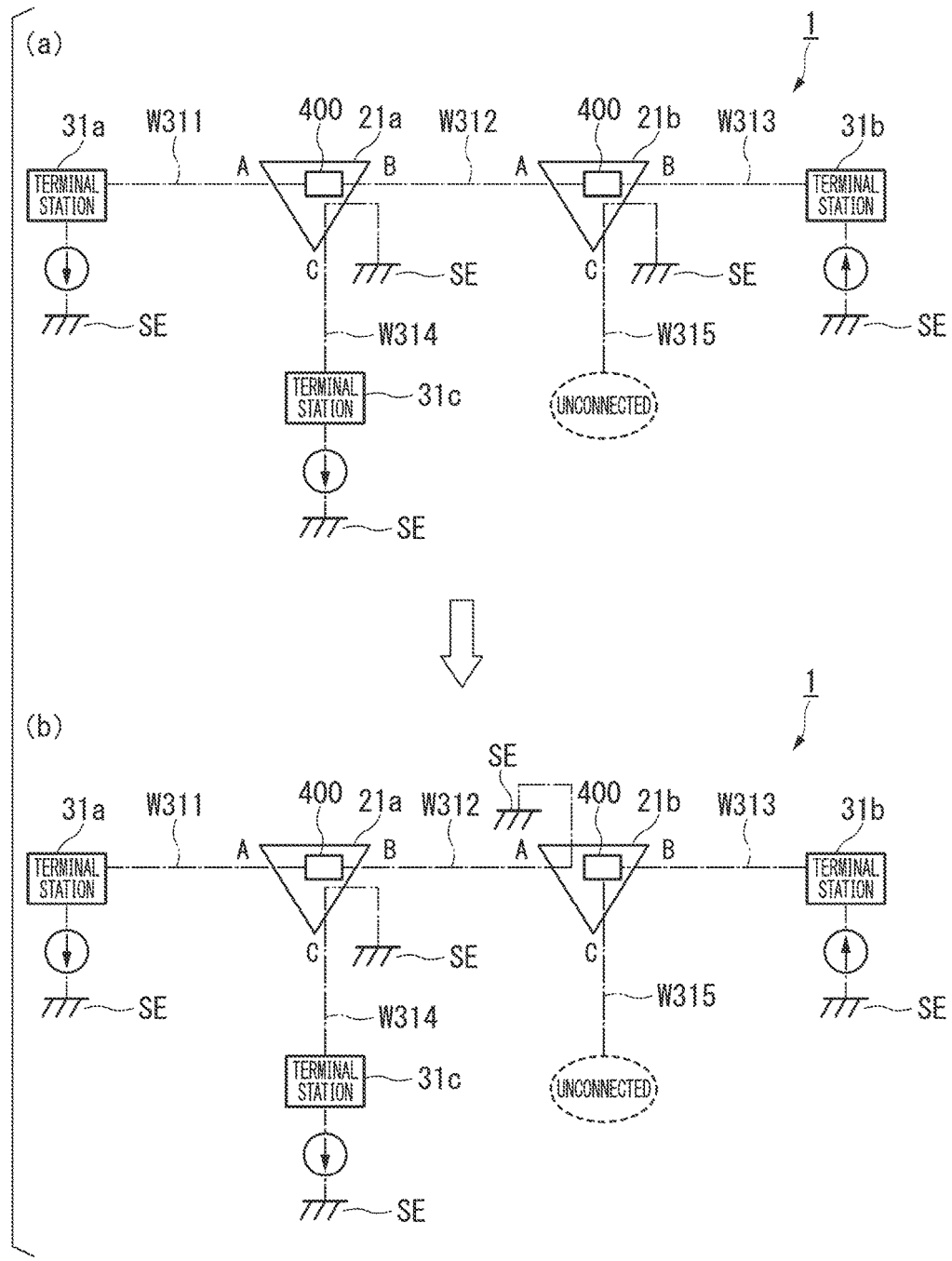
FIG. 7 is a descriptive diagram illustrating another example of feed line switching in the submarine cable system of the same exemplary embodiment.

FIG. 7 is a descriptive diagram illustrating another example of feed line switching in the submarine cable system 1. In FIG. 7, the feed line W315 is in a non-connection state in which one end of the feed line W315 is not connected to the terminal station 31d, for example, because the terminal station 31d (FIG. 6) is under construction.

In FIG. 7(a), a connection relationship is the same as that in FIG. 6(a) except that one end of the feed line W315 is in an unconnected state.

As the optical submarine branching apparatus 21b performs feed line switching to connect the feed line W312 to the sea earth SE and connect the feed line W313 to the feed line W315, similar to the feed line switching in FIG. 6, the state shown in FIG. 7(a) is changed to the state shown in FIG. 7(b).

Since one end of the feed line W315 is in an unconnected state in the state shown in FIG. 7(b), the power is not supplied from the terminal station 31b connected to the feed line W315 through the feed line W313 and the optical submarine branching apparatus 21b. Thus, when the feed lines have the connection relationship of FIG. 7(b), the optical submarine branching apparatus 21b cannot receive supply of power and cannot work. In other words, in the state of FIG. 7(b), even when the terminal station 31b transmits a feed line switching command which instructs to return to the connection relationship of FIG. 7(a) (specifically, a feed line switching command which instructs to connect the feed lines W312 and W313) to the optical submarine branching apparatus 21b, the optical submarine branching apparatus 21b cannot execute the command and cannot return to a state in which reception of the power is possible.

Therefore, as the switching control unit 210 suppresses switching of the predetermined feed line switching command as illustrated in FIGS. 1 and 2, it is possible to prevent a situation in which the feed line switching apparatus does not work when the feed lines have a predetermined connection relationship. For example, when the terminal station 31b transmits a feed line switching command which instructs the optical submarine branching apparatus 21b in the state shown in FIG. 7(a) to switch to the connection of the feed lines illustrated in FIG. 7(b), the switching control unit 210 of the optical submarine branching apparatus 21b controls the switching execution unit 220 to suppress execution of the feed line switching command, thereby preventing entrance into the state shown in FIG. 7(b).

A specific method in which the switching control unit 210 suppresses feed line switching will be described below with reference to FIGS. 8 to 11.

Next, the feed line switching apparatus 11 will be described in greater detail with reference to FIGS. 8 and 9.

Figure 8:
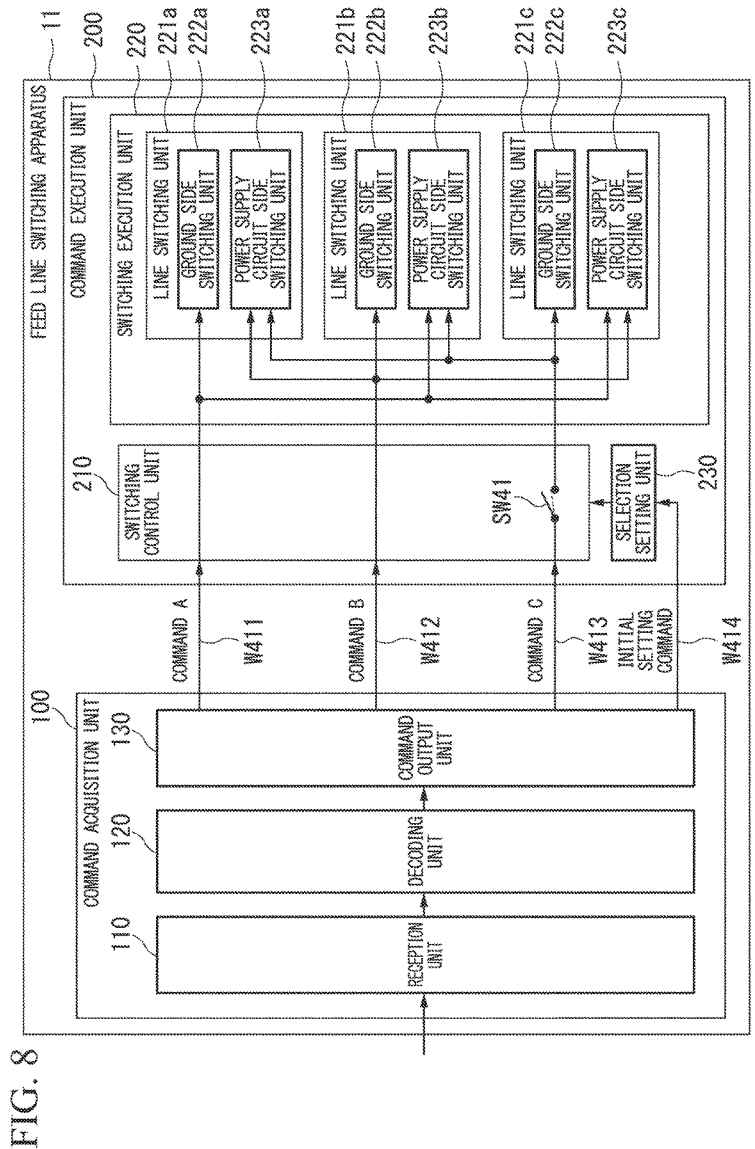
FIG. 8 is a configuration diagram illustrating a more detailed configuration example of the feed line switching apparatus in the same exemplary embodiment.

FIG. 8 is a configuration diagram illustrating a more detailed configuration example of the feed line switching apparatus 11. In FIG. 8, the feed line switching apparatus 11 includes the command acquisition unit 100 and the command execution unit 200. The command acquisition unit 100 includes a reception unit 110, a decoding unit 120, and a command output unit 130. The command execution unit 200 includes the switching control unit 210, the switching execution unit 220, and a selection setting unit 230. The switching execution unit 220 includes the line switching units 221a to 221c. The line switching unit 221a includes a ground side switching unit 222a and a power supply circuit side switching unit 223a. The line switching unit 221b includes a ground side switching unit 222b and a power supply circuit side switching unit 223b. The line switching unit 221c includes a ground side switching unit 222c and a power supply circuit side switching unit 223c.

In FIG. 8, the same units as those of FIG. 1 are denoted by the same reference signs (11, 100, 200, 210, and 220) and a description thereof is omitted. Furthermore, the line switching units 221a to 221c are the same as those of FIG. 5 and a description thereof is omitted.

Furthermore, the line switching units 221a to 221c are collectively referred to as a "line switching unit 221", as described with reference to FIG. 5. Similarly, the ground side switching units 222a to 222c are collectively referred to as a "ground side switching unit 222" and the power supply circuit side switching units 223a to 223c are collectively referred to as a "power supply circuit side switching unit 223".

The reception unit 110 receives an optical signal and outputs the optical signal to the decoding unit 120. A feed line switching command can be included in the optical signal received by this reception unit 110. In other words, when a terminal station transmits a feed line switching command, the feed line switching command is included in this optical signal and transmitted.

Furthermore, when initial setting for the feed line switching apparatus 11 is performed, the reception unit 110 receives an initial setting command and outputs the initial setting command to the decoding unit 120. The initial setting command referred to herein is a command which sets a predetermined feed line switching command (a feed line switching command whose execution is suppressed by the command execution unit 200).

The decoding unit 120 performs decoding on the signal received by the reception unit 110, extracts the feed line switching command and the initial setting command, and outputs the commands to the command output unit 130.

The command output unit 130 outputs the feed line switching command output from the decoding unit 120 to the switching control unit 210 using paths W411 to W413 provided for respective types of feed line switching commands.

In the present exemplary embodiment, the command acquisition unit 100 receives three types of feed line switching commands (hereinafter referred to as "command A", "command B", and "command C") and one type of initial setting command (hereinafter referred to as an "initial setting command").

Command A is a command which instructs to connect a feed line connected to a power reception terminal A included in the feed line switching apparatus 11 to the sea earth and connect a feed line connected to a power reception terminal B included in the feed line switching apparatus 11 with a feed line connected to a power reception terminal C included in the feed line switching apparatus 11. Command B is a command which instructs to connect the feed line connected to the power reception terminal B to the sea earth and connect the feed line connected to the power reception terminal A with the feed line connected to the power reception terminal C. Command C is a command which instructs to connect the feed line connected to the power reception terminal C to the sea earth and connect the feed line connected to the power reception terminal A with the feed line connected to the power reception terminal B.

The initial setting command is a command which sets command C as a predetermined feed line switching command. It is to be noted that, in the example of FIG. 7, the predetermined feed line switching command corresponds to command A, but a description will be hereinafter given on the assumption that the predetermined feed line switching command is command C.

The path W411 is a path through which command A is transferred from the command acquisition unit 100 to the switching execution unit 220. The path W412 is a path through which command B is transferred from the command acquisition unit 100 to the switching execution unit 220. The path W413 is a path through which command C is transferred from the command acquisition unit 100 to the switching execution unit 220. The path W414 is a path through which the initial setting command is transferred from the command output unit 130 to the selection setting unit 230.

The ground side switching unit 222a connects the feed line connected to the power reception terminal A to the sea earth. The power supply circuit side switching unit 223a connects the feed line connected to the power reception terminal A to a power supply circuit (e.g., the power supply circuit 400 of FIG. 2) which supplies power to the feed line switching apparatus 11. The ground side switching unit 222b connects the feed line connected to the power reception terminal B to the sea earth. The power supply circuit side switching unit 223b connects the feed line connected to the power reception terminal B to the power supply circuit which supplies the power to the feed line switching apparatus 11. The ground side switching unit 222c connects the feed line connected to the power reception terminal C to the sea earth. The power supply circuit side switching unit 223c connects the feed line connected to the power reception terminal C to the power supply circuit which supplies the power to the feed line switching apparatus 11.

The switching control unit 210 suppresses the output of the predetermined feed line switching command to be output using the predetermined path W413, and outputs the feed line switching command output using another path W411 or W412 to the switching execution unit 220.

Specifically, the switching control unit 210 includes a switch SW41 provided in the path W413. This switch SW41 transfers command C output from the command output unit 130 to the switching execution unit 220 in a closed state (connected state) and suppresses transfer of command C output from the command output unit 130, to the switching execution unit 220, in an open state (disconnected state). Furthermore, the switching control unit 210 outputs command A output from the command output unit 130 to the switching execution unit 220 using the path W411 and outputs command B output from the command output unit 130 to the switching execution unit 220 using the path W412.

The selection setting unit 230 sets the state (an open state or a closed state) of the switch SW41 in accordance with the initial setting command output from the command acquisition unit 100. As the selection setting unit 230 sets the switch SW41 to the open state, the switching control unit 210 stores command C as a predetermined feed line switching command in the state of the switch SW41. Also, the switching control unit 210 suppresses execution of command C in the command execution unit 200 by suppressing transfer of the stored command C to the switching execution unit 220.

The switch SW41 includes a bi-stable relay, and sets the bi-stable relay to an open state or a closed state in accordance with a current which is output from the selection setting unit 230 in accordance with the initial setting command. No energy is necessary to hold the state of the switch SW41 when the bi-stable relay is used as the switch SW41. In other words, when the bi-stable relay constituting the switch SW41 is set to the open state or the closed state in accordance with the current output from the selection setting unit 230, the bi-stable relay then maintains the set state even when supply of the current is no longer received.

It is to be noted that when the feed line switching apparatus 11 is used in the optical submarine branching apparatus 21 as described with reference to FIG. 2, the state setting of the switch SW41 is performed, for example, before the optical submarine branching apparatus 21 is installed on the bottom of the sea. This is because a setting error is prevented and switching is reliably suppressed based on the predetermined feed line switching command.

It is to be noted that the switch SW41 is not limited to the bi-stable relay, and it may be configured using various switching elements. For example, the switch SW41 may be configured using a thyristor.

It is to be noted that the command acquisition unit 100 may acquire a feed line switching command other than commands A to C. For example, the command acquisition unit 100 may acquire a command to operate only the line switching unit 221*a* so that the command is acquired by the line switching unit 221*a*.

Furthermore, there may be two or more types of feed line switching commands acquired by the command acquisition unit 100.

Furthermore, the switching control unit 210 may include switches for a plurality of commands.

Figure 9:
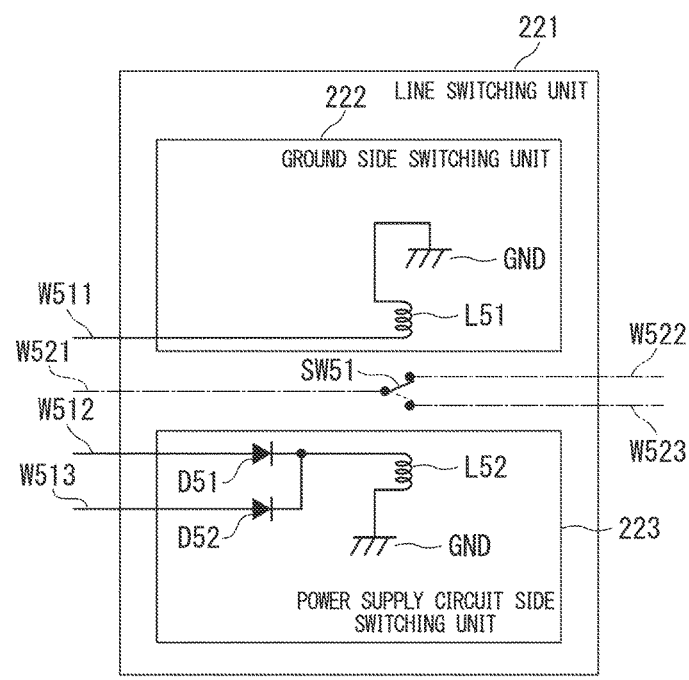
FIG. 9 is a circuit diagram illustrating an example of a circuit configuration of a line switching unit in the same exemplary embodiment.

FIG. 9 is a circuit diagram illustrating an example of a circuit configuration of the line switching unit 221. A switch SW51 illustrated in FIG. 9 corresponds to a switch portion of the bi-stable relay described with reference to FIG. 5, and connects a path W521 connected to a feed line through a power reception terminal to either a path W522 connected to the sea earth (e.g., the sea earth SE of FIG. 5) or a path W523 connected to a power supply circuit (e.g., the power supply circuit 400 of FIG. 5) which supplies power to the feed line switching apparatus 11.

A coil L51 corresponds to the reset coil described with reference to FIG. 5. A path W511 connected to one end of the coil L51 is connected to any one of the paths W411 to W413 in FIG. 8. Furthermore, the other end of the coil L51 is connected to a ground GND which is a reference point of a voltage in the feed line switching apparatus 11. Also, when a current serving as the feed line switching command flows from the path W511 to the ground GND through the coil L51, the coil L51 generates a magnetic field to connect the switch SW51 to the path W522.

A coil L52 corresponds to the set coil described with reference to FIG. 5. Each of paths W512 and W513 connected to one end of the coil L52 through diodes D51 and D52 is connected to any of the paths W411 to W413 in FIG. 8. Furthermore, the other end of the coil L52 is connected to the ground GND, similar to the coil L51. Also, when the current serving as the feed line switching command flows from the path W512 and the path W513 to the ground GND through the coil L52, the coil L52 generates a magnetic field to connect the switch SW51 to the path W523.

It is to be noted that the diodes D51 and D52 each prevent the current serving as the feed line switching command from flowing to the other path.

Here, an operation example of the circuit of FIG. 9 will be described for an example when the line switching unit 221 of FIG. 9 is the line switching unit 221*a* of FIG. 8.

In this case, when the command output unit 130 outputs a current serving as command A, the switch SW51 is connected to the sea earth (the path W522) due to the current. As a result, the feed line connected to the power reception terminal A is connected to the sea earth.

In contrast, when the command output unit 130 outputs the current as command B, the switch SW51 is connected to the power supply circuit (the path W523) due to the current. As a result, the feed line connected to the power reception terminal A is connected to the power supply circuit.

Furthermore, when the command output unit 130 outputs command C, if the switch SW41 (FIG. 8) is closed, the feed line connected to the power reception terminal A is connected to the power supply circuit, similar to the case of command B. In contrast, if the switch SW41 opens, the current serving as command C does not flow and feed line switching is suppressed.

As the switching control unit 210 suppresses feed line switching in the switching execution unit 220 for the predetermined feed line switching command as described above, it is possible to prevent a situation in which the feed line switching apparatus 11 cannot work when the feed lines have a predetermined connection relationship.

Furthermore, the command acquisition unit 100 outputs the acquired feed line switching command to the switching control unit 210 using the paths W411 to 413 provided for respective types of feed line switching commands, and the switching control unit 210 suppresses the output of the predetermined feed line switching command (e.g., command C) to be output using a predetermined path (e.g., the path W413). As a result, a failsafe in the suppression of feed line switching can be realized when a feed line switching command cannot be transferred. In other words, it is possible to prevent a situation in which switching to be suppressed is executed in a state in which a current serving as command C does not flow to the switching execution unit 220, such as disconnection of the path W413.

It is to be noted that the configuration of the feed line switching apparatus 11 is not limited to the configuration described with reference to FIGS. 8 and 9. Hereinafter, a variant of the feed line switching apparatus 11 in the present exemplary embodiment will be described with reference to FIGS. 10 and 11.

Figure 10:
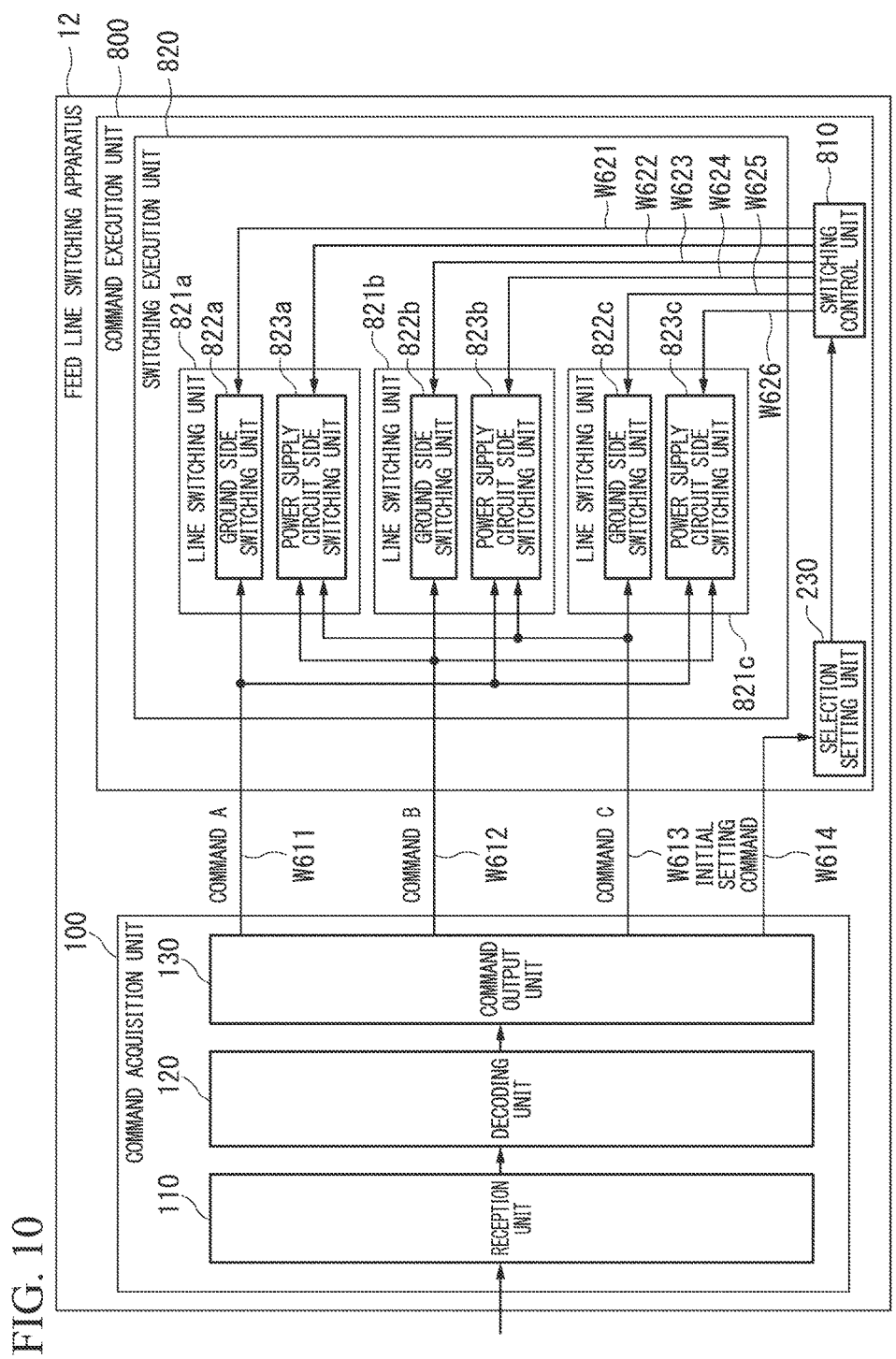
FIG. 10 is a configuration diagram illustrating a schematic configuration of the feed line switching apparatus in a variant of the same exemplary embodiment.

FIG. 10 is a configuration diagram illustrating a schematic configuration of a feed line switching apparatus in the present variant. In FIG. 10, a feed line switching apparatus 12 includes the command acquisition unit 100 and a command execution unit 800. The command acquisition unit 100 includes the reception unit 110, the decoding unit 120, and the command output unit 130. The command execution unit 800 includes a switching control unit 810, a switching execution unit 820, and the selection setting unit 230. The switching execution unit 820 includes line switching units 821*a* to 821*c*. The line switching unit 821*a* includes a ground side switching unit 822*a* and a power supply circuit side switching unit 823*a*. The line switching unit 821*b* includes a ground side switching unit 822*b* and a power supply circuit side switching unit 823*b*. The line switching unit 821*c* includes a ground side switching unit 822*c* and a power supply circuit side switching unit 823*c*. In FIG. 10, the same units as those of FIG. 8 are denoted by the same reference signs (100, 110, 120, 130, and 230) and a description thereof is omitted.

The line switching units 821*a* to 821*c*, the ground side switching units 822*a* to 822*c*, and the power supply circuit side switching unit 823*a* to 823*c* have similar functions as those of the line switching units 221*a* to 221*c*, the ground side switching units 222*a* to 222*c*, and the power supply circuit side switching units 223*a* to 223*c* of FIG. 8, respectively. The line switching units 821*a* to 821*c*, the ground side switching units 822*a* to 822*c*, and the power supply circuit side switching units 823*a* to 823*c* are different from the line switching units 221*a* to 221*c*, the ground side switching units 222*a* to 222*c* and the power supply circuit side switching units 223*a* to 223*c* in terms of a method in which the units are controlled by the switching control unit 810 which will be described below using FIG. 11. It is to be noted that signals for the switching control unit 810 to control the ground side switching units 822*a* to 822*c* are transferred through paths W621, W623, and W625. Signals for the switching control unit 810 to control the power supply circuit side switching units 823*a* to 823*c* are transferred through paths W622, W624, and W626.

The command output unit 130 outputs the feed line switching command output from the decoding unit 120 using the path provided for each type of feed line switching command, as described with reference to FIG. 8. In the example of FIG. 10, the command output unit 130 outputs the feed line switching command output from the decoding unit 120, to the switching execution unit 820 using paths W611 to W613. Furthermore, the command output unit 130 outputs the initial setting command to the selection setting unit 230 through a path W614.

The switching control unit 810 suppresses feed line switching in the switching execution unit 820 for a predetermined feed line switching command among feed line switching commands that the command acquisition unit 100 (command output unit 130) outputs to the switching execution unit 820 by bypassing the predetermined feed line switching command.

Here, the bypass of the feed line switching command performed by the switching control unit 810 will be described with reference to FIG. 11.

Figure 11:
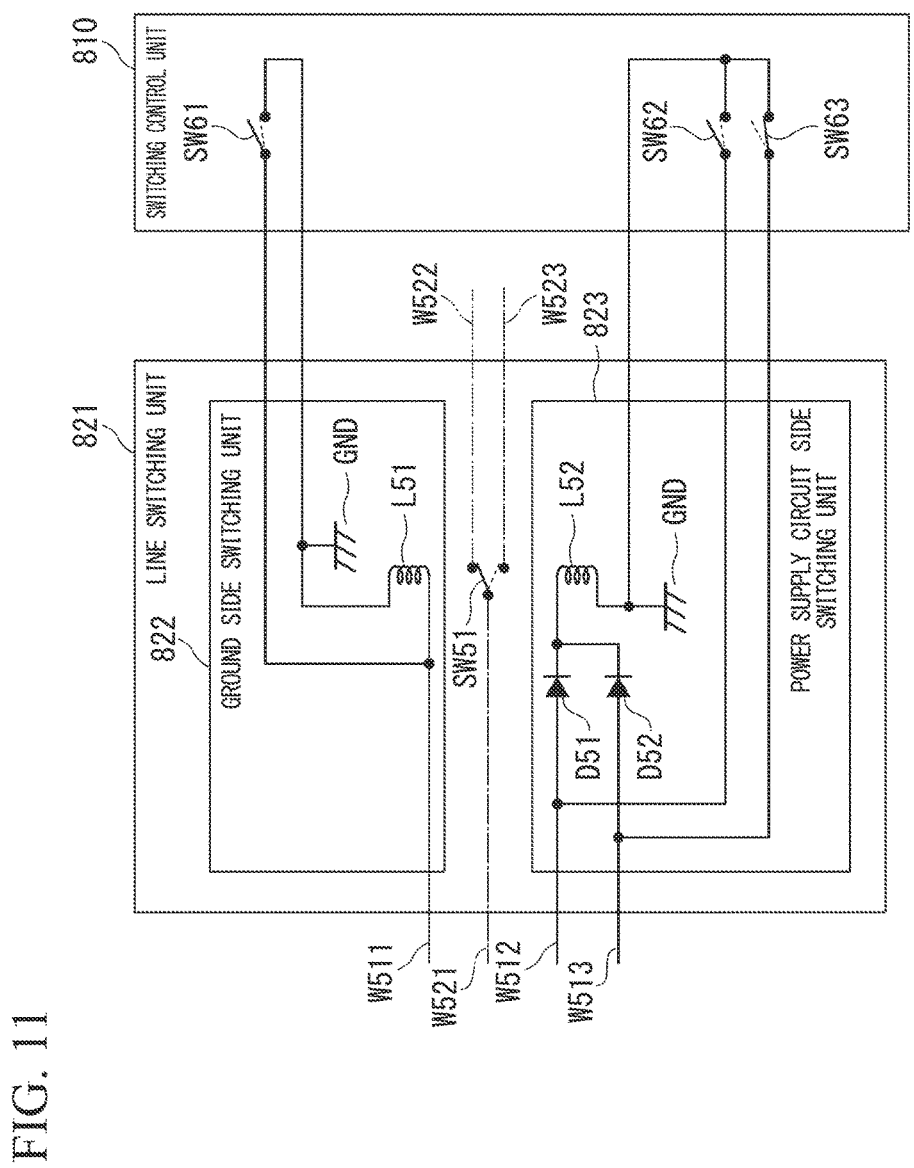
FIG. 11 is a circuit diagram illustrating an example of a circuit configuration of a line switching unit in the same variant.

FIG. 11 is a circuit diagram illustrating an example of a circuit configuration of a line switching unit 821. In FIG. 11, the same units as those of FIG. 9 are denoted by the same reference signs (SW51, L51, L52, D51, D52, W511 to W513, W521 to W523, and GND), and a description thereof is omitted. It is to be noted that the paths W511 to W513 are connected to any of the paths W611 to W613 to flow a current serving as the feed line switching command, similar to the case of FIG. 9.

A switch SW61 bypasses the current flowing through the path W511 in its closed state. In other words, when the current serving as the feed line switching command flows through the path W511 in a state in which the switch SW61 is closed, the current flows to the ground GND via the switch SW61, so that the current to the coil L51 is suppressed. As a result, the switch SW51 switching the path W521 from a state in which the path W521 is connected to the path W523 to a state in which the path W521 is connected to the path W522 is suppressed.

Similarly, a switch SW62 bypasses the current flowing through the path W512 in its closed state. As a result, the switch SW51 switching the path W521 from a state in which the path W521 is connected to the path W522 to a state in which the path W521 is connected to the path W523 is suppressed. Similarly, a switch SW63 bypasses the current flowing through the path W513 in its closed state. As a result, the switch SW51 switching the path W521 from a state in which the path W521 is connected to the path W522 to a state in which the path W521 is connected to the path W523 is suppressed.

The opening and closing of the switches SW61 to SW63 are set from the selection setting unit 230 (FIG. 10) in advance (before the feed line switching apparatus 12 acquires the feed line switching command).

For example, when an initial setting command used to set command C as a predetermined feed line switching command is acquired, the selection setting unit 230 bypasses each path through which a current serving as command C flows. Specifically, the selection setting unit 230 closes the switch SW63 which bypasses the coil L52 of the power supply circuit side switching unit 823a, closes the switch SW63 which bypasses the coil L52 of the power supply circuit side switching unit 823b, and closes the switch SW61 which bypasses the coil L51 of the ground side switching unit 822c. Here, the path W513 of the power supply circuit side switching unit 823a and the path W513 of the power supply circuit side switching unit 823b are both paths connected to the path W613.

As a result, feed line switching based on command C is suppressed.

The switches SW61 to SW63 are configured using bi-stable relays, similar to the switch SW41 of FIG. 8. Also, the switches SW61 to SW63 set the bi-stable relays to an open state or a closed state in accordance with currents output from the selection setting unit 230 in accordance with the initial setting command. No energy is necessary to hold the states of the switches SW61 to SW63 when the bi-stable relays are used as the switches SW61 to SW63.

It is to be noted that when the feed line switching apparatus 12 is used in the optical submarine branching apparatus 21 as described with reference to FIG. 2, the state setting of the switches SW61 to SW63 is performed, for example, before the optical submarine branching apparatus 21 is installed on the bottom of the sea. This is because a setting error is prevented and switching based on a predetermined feed line switching command is reliably suppressed.

It is to be noted that the switches SW61 to SW63 are not limited to the bi-stable relays, and they may be configured using various switching elements, similar to the case of the switch SW41. For example, the switches SW61 to SW63 may be configured using thyristors.

As described above, as the switching control unit 810 suppresses feed line switching in the switching execution unit 820 for a predetermined feed line switching command, it is possible to prevent a situation in which the feed line switching apparatus 12 cannot work when the feed lines have a predetermined connection relationship.

Furthermore, the command acquisition unit 100 outputs the acquired feed line switching command to the switching execution unit 820, and the switching control unit 810 bypasses a predetermined feed line switching command among the feed line switching commands that the command acquisition unit 100 outputs to the switching execution unit 820. As a result, a failsafe in the suppression of feed line switching can be realized when the bypass conducts. In other words, it is possible to prevent a situation in which switching to be suppressed is executed in a state in which a coil for a relay operation (the coil L51 or L52 of FIG. 11) is bypassed due to, for example, failure of the switch for bypass (switches SW61 to SW63 of FIG. 11).

While the present invention has been described above using the exemplary embodiments, a technical scope of the present invention is not limited to the scope described in the exemplary embodiments described above. It is apparent to those skilled in the art that various changes or improvements can be made to the exemplary embodiments. It is apparent from the recitation of claims that modes in which the various changes or improvements have been made can be included within the technical scope of the present invention.

This application is based upon and claims the benefit of priority from Japanese Patent Application No. 2011-145089, filed on Jun. 30, 2011, the disclosure of which is incorporated herein in its entirety by reference.

INDUSTRIAL APPLICABILITY

The present invention is applicable to, for example, switching of a connection relationship of the feed lines in the sea. In the present invention, it is possible to prevent a situation in which the feed line switching apparatus cannot work when the feed lines have a predetermined connection relationship.

DESCRIPTION OF REFERENCE SIGNS 1 submarine cable system
11 feed line switching apparatus
21 optical submarine branching apparatus 31 terminal station
100 command acquisition unit
110 reception unit
120 decoding unit
130 command output unit
200 command execution unit
210 switching control unit
220 switching execution unit
221a to 221c line switching unit
222a to 222c ground side switching unit
223a to 223c power supply circuit side switching unit
300 optical branching circuit
400 power supply circuit
500 optical coupler

The invention claimed is:

1. A feed line switching apparatus comprising:
  a command acquisition unit which acquires a feed line switching command which designates a connection relationship of feed lines;
  a switching execution unit which switches the connection relationship of the feed lines in accordance with the feed line switching command acquired by the command acquisition unit; and
  a switching control unit which suppresses switching of the connection relationship of the feed lines in the switching execution unit for a predetermined feed line switching command.

2. The feed line switching apparatus according to claim 1, wherein the command acquisition unit outputs the acquired feed line switching command to the switching control unit using a path provided for each type of feed line switching command, and
  the switching control unit suppresses output of the predetermined feed line switching command to be output using a predetermined path, and outputs the feed line switching command to be output using another path to the switching execution unit.

3. The feed line switching apparatus according to claim 1, wherein the command acquisition unit outputs the acquired feed line switching command to the switching execution unit, and
  the switching control unit suppresses switching of the connection relationship of the feed lines in the switching execution unit for the predetermined feed line switching command by bypassing the predetermined feed line switching command among the feed line switching commands that the command acquisition unit has output to the switching execution unit.

4. The feed line switching apparatus according to claim 1, wherein the feed line switching apparatus works using power supplied through the feed lines.

5. The feed line switching apparatus according to claim 4, wherein the predetermined feed line switching command is a command which causes the power not to be supplied to the feed line switching apparatus if the connection relationship of the feed lines is switched in accordance with the predetermined feed line switching command.

6. An optical submarine branching apparatus comprising the feed line switching apparatus according to claim 1.

7. The optical submarine branching apparatus according to claim 6, wherein a setting for suppressing switching of the connection relationship based on the predetermined feed line switching command is performed before the optical submarine branching apparatus is installed on the bottom of the sea.

8. A submarine cable system comprising the optical submarine branching apparatus according to claim 6.

9. The feed line switching apparatus according to claim 3, wherein the feed line switching apparatus works using power supplied through the feed lines.

10. The feed line switching apparatus according to claim 9, wherein the predetermined feed line switching command is a command which causes the power not to be supplied to the feed line switching apparatus if the connection relationship of the feed lines is switched in accordance with the predetermined feed line switching command.

11. An optical submarine branching apparatus comprising the feed line switching apparatus according to claim 2.

12. The optical submarine branching apparatus according to claim 11, wherein a setting for suppressing switching of the connection relationship based on the predetermined feed line switching command is performed before the optical submarine branching apparatus is installed on the bottom of the sea.

13. A submarine cable system comprising the optical submarine branching apparatus according to claim 11.

14. An optical submarine branching apparatus comprising the feed line switching apparatus according to claim 3.

15. The optical submarine branching apparatus according to claim 14, wherein a setting for suppressing switching of the connection relationship based on the predetermined feed line switching command is performed before the optical submarine branching apparatus is installed on the bottom of the sea.

16. A submarine cable system comprising the optical submarine branching apparatus according to claim 14.

17. A submarine cable system comprising the optical submarine branching apparatus according to claim 15.

* * * * *